(12) United States Patent
Britto et al.

(10) Patent No.: US 7,194,437 B1
(45) Date of Patent: Mar. 20, 2007

(54) COMPUTER-BASED FUNDS TRANSFER SYSTEM

(75) Inventors: Mark J. Britto, Baton Rouge, LA (US); Aimee K. Cardwell, Palo Alto, CA (US); FuMing Young, Los Altos, CA (US); Nicholas K. Peddy, Redwood City, CA (US); Adrian J. Blakey, Alameda, CA (US); Angela C. Lee, Burlingame, CA (US); Erich L. Ringewald, Kenwood, CA (US)

(73) Assignee: Amazon.com, Inc., Seattle, WA (US)

( * ) Notice: Subject to any disclaimer, the term of this patent is extended or adjusted under 35 U.S.C. 154(b) by 700 days.

(21) Appl. No.: 09/312,309

(22) Filed: May 14, 1999

(51) Int. Cl.
G06Q 40/00 (2006.01)
(52) U.S. Cl. .......................................... 705/40; 705/39
(58) Field of Classification Search ................ 705/39, 705/38, 40, 44, 35; 235/379
See application file for complete search history.

(56) References Cited

U.S. PATENT DOCUMENTS

| | | | |
|---|---|---|---|
| 4,727,243 A | 2/1988 | Savar | |
| 4,734,564 A | 3/1988 | Boston et al. | 235/380 |
| 4,799,156 A * | 1/1989 | Shavit et al. | 364/401 |
| 4,823,264 A | 4/1989 | Deming | |
| RE32,985 E * | 7/1989 | Nagata et al. | 364/401 |
| 5,237,159 A | 8/1993 | Stephens et al. | |
| 5,393,963 A | 2/1995 | Thomas et al. | |
| 5,472,190 A | 12/1995 | Norling | |
| 5,475,403 A | 12/1995 | Havlovick et al. | |
| 5,491,325 A | 2/1996 | Huang et al. | |
| 5,504,677 A | 4/1996 | Pollin | |
| 5,532,464 A | 7/1996 | Josephson et al. | |
| 5,583,759 A | 12/1996 | Geer | |
| 5,592,377 A | 1/1997 | Lipkin | |
| 5,659,469 A | 8/1997 | Deaton et al. | |
| 5,677,955 A | 10/1997 | Doggett et al. | |
| 5,691,524 A | 11/1997 | Josephson | |
| 5,692,132 A | 11/1997 | Hogan | |
| 5,699,528 A | 12/1997 | Hogan | |
| 5,710,887 A | 1/1998 | Chelliah et al. | |
| 5,727,249 A | 3/1998 | Pollin | |

(Continued)

OTHER PUBLICATIONS

G. Medvinsky et al., "Electronic Currency for the Internet," University of Southern California (Research Project).

(Continued)

*Primary Examiner*—Vincent Millin
*Assistant Examiner*—Kelly Campen
(74) *Attorney, Agent, or Firm*—Knobbe, Martens, Olson & Bear LLP

(57) ABSTRACT

A service configured to be accessible by two or more parties to a two-sided funds transfer transaction through a computer network (e.g., the Internet) provides functionality for sending a payment request to a target payer or payee who is not yet registered with the service. Depending upon who is initiating the transaction (i.e., a payer or a payee) the payment requests may be received as requests to send payments or requests to collect payments. In the latter case, the service may be further organized to solicit a payment, for example by transmitting an e-mail message to a second party to the funds transfer transaction. When used to collect payments, the service may be further organized to process one or more responses to the above-mentioned solicitations.

7 Claims, 2 Drawing Sheets

U.S. PATENT DOCUMENTS

| | | |
|---|---|---|
| 5,732,400 A | 3/1998 | Mandler et al. |
| 5,757,917 A | 5/1998 | Rose et al. |
| 5,774,879 A | 6/1998 | Custy et al. |
| 5,774,882 A | 6/1998 | Keen et al. |
| 5,781,654 A | 7/1998 | Carney |
| 5,794,219 A | 8/1998 | Brown |
| 5,799,157 A | 8/1998 | Escallon |
| 5,802,497 A | 9/1998 | Manasse |
| 5,815,665 A | 9/1998 | Teper et al. ........... 395/200.59 |
| 5,822,737 A | 10/1998 | Ogram |
| 5,826,241 A | 10/1998 | Stein et al. |
| 5,826,245 A | 10/1998 | Sandberg-Diment |
| 5,832,463 A | 11/1998 | Funk |
| 5,832,464 A | 11/1998 | Houvener et al. |
| 5,835,603 A | 11/1998 | Coutts et al. |
| 5,835,899 A | 11/1998 | Rose et al. |
| 5,848,400 A | 12/1998 | Chang |
| 5,869,821 A | 2/1999 | Lee et al. |
| 5,872,844 A | 2/1999 | Yacobi |
| 5,924,082 A * | 7/1999 | Silverman et al. ............ 705/37 |
| 6,073,117 A * | 6/2000 | Oyanagi et al. .............. 705/38 |
| 6,141,653 A * | 10/2000 | Conklin et al. ............... 705/80 |
| 6,240,396 B1 * | 5/2001 | Walker et al. ................ 705/26 |

OTHER PUBLICATIONS

G. Medvinsky et al., "NetCash: A design for practical electronic currency on the Internet," Association for Computing Machinery 1993.

B. Clifford Neuman et al., "Requirements for Network Payment: The NetCheque™ Perspective," Proceedings of IEEE Compcon '95, San Francisco, Mar. 1995.

"Credit Card Fraud Against Merchants—What Internet Merchants Need to Know," 1998, CyberSource Corporation. Document 22198. pp. 1-13.

* cited by examiner

US 7,194,437 B1

COMPUTER-BASED FUNDS TRANSFER SYSTEM

FIELD OF THE INVENTION

The present invention relates generally to electronic commerce (e-commerce) schemes that allow for the transfer of funds between individuals and others across computer networks and networks of networks, such as the Internet.

BACKGROUND

The transfer of funds between individuals lies at the heart of a variety of transactions. In single-party transactions, for example involving an account-holder who either deposits or withdraws money from his/her account (e.g., a bank account), only one party participates in the process, although one or more financial institutions may be involved. In unmediated two-party transfers, for example cash transfers between a buyer and a seller in payment for goods or services, gift transfers, loans, etc., there are two parties involved in the transaction. Finally, in mediated three-party transactions using credit or debit cards or checks, a guarantor or other third party in addition to the payer and payee is involved. Increasingly, some or all of these transfers may be completed electronically, making use of computer networks and/or networks of networks, such as the Internet.

Among the more recent developments involving mediated three-party transactions are the expanded opportunities for the use of the Internet as a vehicle by which transfers may be arranged and/or implemented. For example, Internet-based bill presentment systems are now being offered in which a merchant (e.g., a local telephone company or other utility provider) may arrange for regular bills to be delivered electronically to a consumer. The consumer is then offered the option of paying the bill electronically by providing the bill presentment service provider with bank account information and payment authorization. This information (and the accompanying authorization) allows the bill presentment service provider to arrange for the transfer of funds between the consumer's account and that of the merchant, for example using the Automated Clearing House (ACH) funds transfer facilities of the banking industry. Presently, however, such systems are asymmetrical in as much as they do not provide means for individual consumers to arrange for the transfer of funds to or from merchants or other consumers.

Moreover, although the popularity of the Internet has led to a dramatic expansion of e-commerce opportunities, with these opportunities comes the increased risk of fraud in e-commerce transactions. Indeed, some have estimated that close to 40% of the total number of attempted orders placed to Internet merchants are fraudulent or otherwise unapproved credit transactions. See, "Credit Card Fraud Against Merchants", document 22198, CyberSource Corporation, at p. 3 (1998). To combat these fraudulent transactions, others have developed authorization and verification services which attempt to provide some assurance to a seller that a buyer is who he or she is purports to be. Some of these authorization and verifications services include risk management assessment capabilities that score buyers and allow merchants to assess whether or not a transaction should be completed based on the score.

Although these verification services provide some degree of protection against fraudulent e-commerce transactions, they are for the most part limited to a select group of users—namely large merchants. Because of the fees and other system requirements associated with presently existing verification services, small merchants and/or individuals are generally unable to make use of them.

It is also true that wire transfers between individuals across private networks have been available for many years. However, such schemes lack the convenience offered by the Internet. To illustrate, consider that in most wire transfer schemes (other than wire transfers between banks, etc.) an individual (the payer) is required to deposit the funds to be transferred at a physical location (e.g., a local branch office of the wire transfer service). Upon such deposit, payment instructions are transmitted to a remote branch office of the service, where the payee must then present him/herself to receive the funds. While such systems may provide international service, they are cumbersome in as much as both the payer and the payee are required to be physically present to deposit or receive the funds. Often this is impossible, or at least inconvenient, for one or both of these parties.

With wire transfers from one individuals' bank account to another (e.g., utilizing the FEDWIRE system), an initiator must know the recipient's account information and specify it to a bank or other financial institution. Such transactions currently cannot be initiated by consumers using an Internet resource.

Other limitations of current funds transfer schemes (both electronic and otherwise) are highlighted in the transactions that typically occur in on-line, person-to-person auction houses. During on-line auctions, prospective buyers bid on products being offered by sellers. At the close of such bidding, the seller and highest bidder (now the buyer) are notified that the auction has been completed and are usually invited to contact one another to complete the sale. Rarely, if ever, though does the auction house provide a mechanism for the transaction to be completed. Instead, the buyer and seller are left to determine amongst themselves the best way to exchange the goods for payment.

Because the sellers tend to be individuals and not traditional merchants, the sellers often are unable to accept (or, indeed, unwilling to accept) credit cards. Moreover, because the buyers are dealing with an individual seller whom they may not know, the buyer is less likely to be willing to provide such credit card information. Further, as indicated above, the current electronic funds transfer mechanisms are simply not able to accommodate individual-to-individual transfers. This leaves personal checks, which are inconvenient to generate, mail and deposit for the buyer and seller, and which may cause delay in shipping as sellers wait for checks to clear, cashiers' checks, money orders or wire transfers (some or all of which often have processing fees associated with them, not to mention the inconvenience of having to obtain a payment instrument from a bank or other institution) as the only viable payment options. Generally, none of these solutions are very satisfactory from the buyer's point of view, yet the buyer is left having to choose one of these options if he or she wishes to complete the sale. Thus, there is a need for a payment transmission system for e-commerce transactions and/or to facilitate money transfers between individuals and/or small merchants that overcomes the limitations of existing schemes.

SUMMARY OF THE INVENTION

In one embodiment, a service is configured to be accessible by two or more parties to a two-sided funds transfer transaction through a computer network (e.g., the Internet) and is organized to (1) collect credit and authentication information regarding at least one party on each side of the transaction, (2) receive funds transfer instructions from at least one party an a first side of the transaction, and (3) transmit payment instructions to complete the transaction upon successful completion of a transaction review process that utilizes the credit and/or authentication information so collected. The payment instructions are preferably transmitted via electronic mail (e-mail). Depending upon who is initiating the transaction (i.e., a payer or a payee) the funds transfer instructions may be received as requests to send payments or requests to collect payments. In the latter case, the service may be further organized to solicit a payment, for example by transmitting an e-mail message to one or more payers.

When used to collect payments, the service may be further organized to process one or more responses to the above-mentioned solicitations. Generally, such responses will be received through a user interface accessible through a Web browser and will include payment method instructions. The payment method instructions may include instructions for payment through an electronic check, instructions to have funds automatically transferred from a bank account and/or instructions for payment by credit card.

The transaction review process may be automated and/or manual, at least in part, with the automated component relying, perhaps, on risk assessment scoring provided by a party that is not directly associated with the funds transfer transaction. Alternatively, or in addition, the process may include authentication by an electronic check acceptance and/or guarantee service provider.

These and other features and advantages of the present invention will be explained below in connection with the accompanying drawings.

BRIEF DESCRIPTION OF THE DRAWINGS

The present invention is illustrated by way of example, but not limitation in the figures of the accompanying drawings, however, these details should not be deemed to limit the broader spirit and scope of the present invention as set forth in claims that follow the accompanying description.

DETAILED DESCRIPTION

Described herein is an electronic transaction service for computer assisted (e.g., on-line/e-commerce) transactions. Throughout this discussion, reference will be made to various environments within and around which the systems and methods of the present invention may find application. Examples of such environments include funds transfers between individuals and/or small merchants, perhaps in settlement of private debts (e.g., Internet-based or other e-commerce transactions such as auction purchases, or debts incurred as a result of other processes), gift transfers, loans, etc. Of course, the present scheme is also applicable in other environments. For example, the systems and methods described herein may be applied in transactions involving donations to charity organizations, collections for office pools or group gifts, etc. Therefore, it should be recognized that the present invention is in no way limited by the examples presented herein.

The electronic transaction service may be hosted on an Internet-based (or other computer/network-based) resource capable of executing the processes described herein. Examples of such resources include conventional computer systems that include processors, memory and other storage devices and peripherals that allow for connection to the Internet (e.g., modems and the like). The precise hardware configuration of the hosting resource is not critical to the present invention, nor are the precise algorithms used to implement the services and methods described herein. Instead, the focus is on the nature of the services provided, including the provision of some measure of fraud protection for payers and payees involved in the transactions.

In the event the risk management assessment procedures utilized by the funds transfer service produce a adverse indication (e.g., an indication that a credit card a payer is attempting to use has been reported stolen, or that the identity of the person attempting to initiate or receive payment can not be authenticated, or that account information provided by the payer indicates that insufficient funds are available to complete the transaction and/or that the payer or payee otherwise poses a risk) the associated payment request will be declined. Otherwise, a payment request can be processed for delivery of a payment associated therewith to the payee. Thus, payers and payees receive the benefit of a risk assessment process that is not normally accorded to or available for individuals or small merchants with existing authorization and verification services. This service is particularly useful in person-to-person commerce, where the parties do not know one another.

Figure 1:
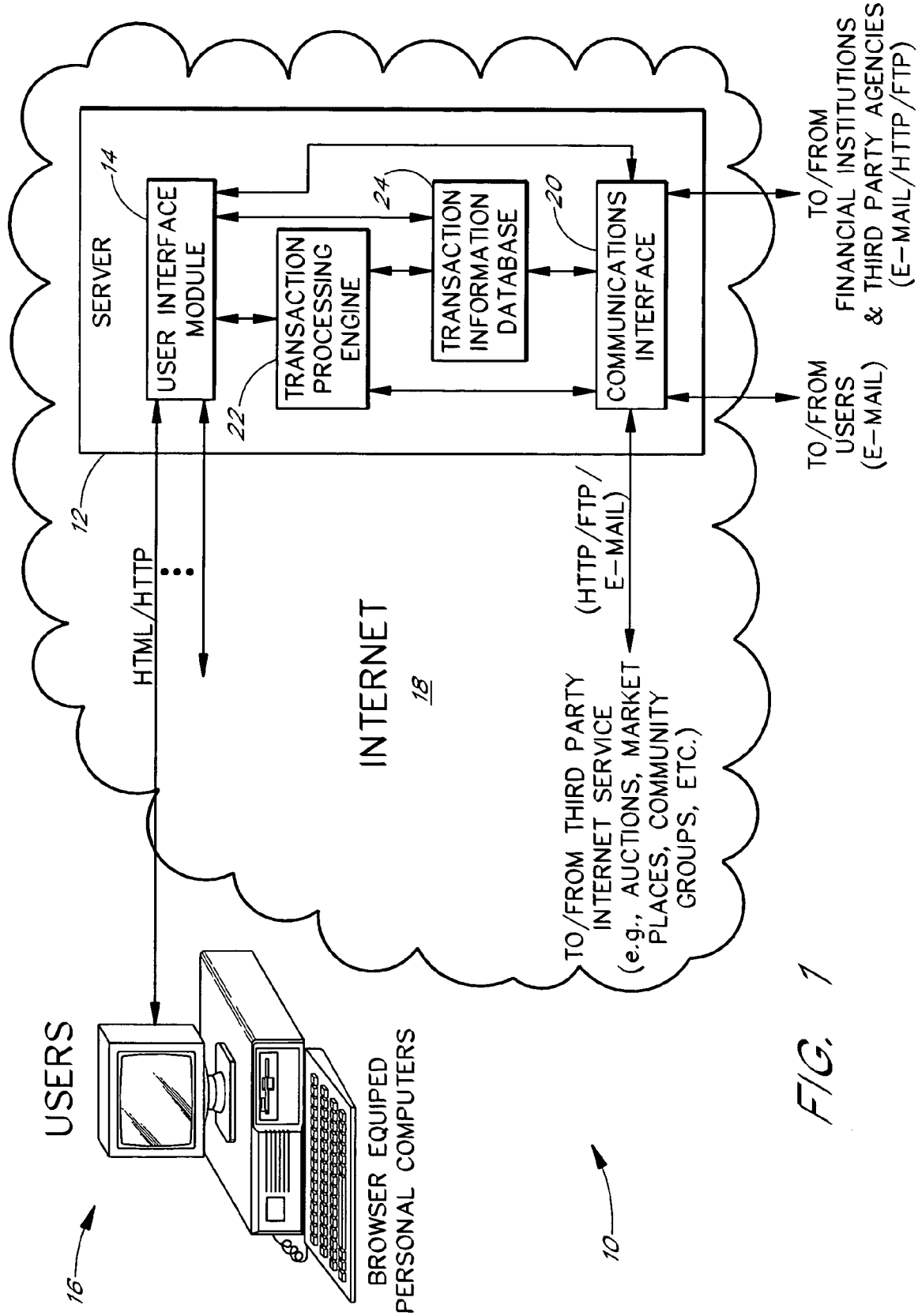
FIG. 1 illustrates exemplary details concerning functional components of an electronic transaction system configured in accordance with an embodiment of the present invention.

To better understand the present invention, reference is made to FIG. 1, which illustrates one example of a funds transfer system 10 configured to provide electronic funds transfer services. Funds transfer system 10 may be embodied as hardware and/or software components of a server 12 or other computer system (such as a multiple server arrangement) as is customary in the art. Funds transfer system 10 includes a user interface module 14, which may be utilized by payers and/or payees for the registration and payment request operations discussed below. Thus, this user interface module 14 allows for customer/server dialogs (e.g., by soliciting and receiving transaction and payer/payee information) and may process information through the submission of Web forms completed by the users 16 (e.g., via personal computers or other Internet-capable devices). Generally, server 12 will be accessed through the Internet 18 (e.g., via Web browsers) in the conventional fashion.

Operating in conjunction with the user interface module 14 may be a communication interface 20. The communications interface 20 may support the automatic distribution of update reports regarding the various stages of processing a payment request. For example, e-mail messages may be transmitted to the parties regarding the successful (or unsuccessful) processing of the payment request. Further, the communications interface block 20 may allow for transmitting and receiving instructions/responses from banks and/or other financial institutions (e.g., to initiate ACH transactions, etc.) or third party agencies (e.g., credit reporting/verification agencies and the like).

A transaction processing engine 22, which may implement automated portions of the above-described fraud review processing, is also an element of funds transfer system 10. So too is a transaction information database 24, which supports the interaction with the third party authorization and verification services as well as customers and financial institutions by maintaining user accounts, transaction requests, etc.

In general, a funds transfer process to be implemented by the funds transfer system 10 has several components. At the outset, a payment request (e.g., initiated by a user 16) is received at server 12 (e.g., via the user interface module 14). The payment request may come in a variety of forms. For example, in some cases the payment request will be a request by a payer to transfer funds to a designated payee (or payees). In other cases, the payment request may be a request to collect funds for a payee from a designated payer (or group of payers).

The payment request may be submitted through the use of Web forms. In general, a Web form is a collection of form fields displayed as a Web page by a Web browser in response to hypertext markup language (HTML) tags and other information received from a Web server. An associated form handler resides at the server to collect and process the information submitted by a user via the form. By using such forms, the information collection process performed by the server is made interactive with the users. That is, users can add text to text boxes, select from drop down menus and/or select check boxes and/or radio buttons, etc. Typically, the user submits the Web form by clicking on (i.e., selecting with a cursor control device) a submit button or other appropriately labeled element of the form and, upon such submission, the contents of the form are passed to the form handler. Depending upon the type of information being submitted and the type of form handler being used, the information submitted by a user may be appended to a file maintained by the server, for example a file associated with an account assigned to the user for the transaction of interest. In this way, information regarding the transaction may be collected, processed and displayed to those who access it.

Thus, in the present example, server 12 which hosts the funds transfer service may be configured to provide HTML instructions using the hypertext transfer protocol (HTTP) so as to cause a user's Web browser to render one or more Web forms for use in submitting a payment request. Such Web forms may be organized as check box fields, radio button fields and/or other form fields such as text box fields or drop down menus, etc. through which users can specify payer and payee information (e.g., as e-mail addresses), payment amount information, payment method information (e.g., credit/debit card/account and/or checking account information) credit information, account information, etc. Where the transaction is in support of an auction, additional information such as the terms of the auction purchase (e.g., the item description and identification number, if any, etc.) and any other transaction fees may also be included in the payment request. The precise nature of the Web form(s) to be used to collect the payment request is not critical to the present invention. Payment request information received at server 12 may be stored (e.g., on a transaction-by-transaction and/or user account basis) in transaction information database 24.

Once received, the payment request is reviewed (e.g., automatically by the transaction processing engine 22) and a determination is made as to whether the payment request is by a payee or a payer. If the request was submitted by a payee (i.e., someone is asking the funds transfer service to contact others and ask that they use the service as a payment vehicle), then the payer(s) will have to be contacted. One way in which this contact may be initiated is through electronic mail (e-mail) messages transmitted by the funds transfer service on behalf of the payee (e.g., via communications interface 20).

For example, using payer information entered by the payee as part of the payment request, server 12 may transmit e-mail messages to the payer(s) indicating that the payee has requested use of the service to facilitate a payment. The payer(s) may be presented with a uniform resource locator (URL) that specifies a Web address of server 12. By pointing a Web browser at that Web address, payers may contact the server (e.g., via the user interface module 14), register with the service (if they are not already so registered), access the transaction of interest (i.e., the one initiated by the payee) and provide payment instructions. In those cases where a payer declines the invitation to use the service, the payee may be so notified (e.g., by e-mail message through communication interface 20).

Where a payer does agree to participate in the transaction, or where a check on the original payment request indicates it is being made by a payer (i.e., someone that is trying to send money to one or more others), a fraud check may be initiated using the transaction processing engine 22. The fraud check (or more generally a risk assessment process of which the fraud check may be a part) is an opportunity for the funds transfer service to verify/analyze the credit, authentication and/or other information provided by the payer and payee (either as part of the payment request or in response to a payee request, or perhaps obtained by an analysis or prior transactions involving one or more of the parties to the present transaction) and/or from information obtained from third parties (e.g., credit reporting agencies and the like). The criteria by which this assessment is made may vary from transaction to transaction but may include such factors as the amount being transferred, the payer's payment preferences (e.g., use of credit card, debit card or electronic check authorizing retrieval of funds directly from a checking account), prior user history or other criteria (as discussed below).

In some cases, this fraud check may indicate that the transaction is one that poses a high degree of risk and/or that review by non-automated means (e.g., human risk management assessors) is needed. Where needed, such a manual review process may be performed. If, in the end, the transaction fails the fraud check procedure, then the payer(s) and/or the payee(s) may be so notified, for example by e-mail messages. As part of such messages (e.g., the messages transmitted to the payer(s)) or in follow up communications, a request for additional credit information (e.g., an alternative credit card and/or bank account) may be made. This provides the payer(s) with another opportunity to complete the funds transfer. If the additional information is provided, the fraud check process may be reinitiated on the basis of this new information. Otherwise, if no new information is provided by the payer(s), the transaction may be declined.

Assuming that the fraud check process is passed successfully, the transaction may be settled. Depending upon the payment method and/or the payee's preferences, this settlement may be accomplished in one of a number of forms. For example, the credit card or electronic check information submitted by the payer may be passed to a third party (e.g., via a file transfer according to the file transfer protocol (FTP) or via e-mail instructions through communication interface 20) for processing to obtain funds. In general, this third party need not be otherwise associated with the transaction. Several existing companies provide for such services. For example, CyberSource Corporation provides fulfillment services for credit card transactions. Similarly, TeleCheck provides for fulfillment of electronic check transactions. Either of these services or another electronic check and/or guarantee service provider may be used for the fulfillment operation to obtain the funds authorized by the payer(s).

Once server 12 receives an indication that such finds have been made available (e.g., by notification of a deposit into a merchant account maintained by the funds transfer service), instructions for transfer to the payee may be issued. These instructions may prompt the generation of a physical check or other payment instrument (e.g., cashiers' check or money order) to be provided to the payee. In other cases, where the payee has chosen to have funds automatically deposited to an account (e.g., via an ACH transaction), these instructions may authorize such a transfer. Where automated transfers (e.g., ACH transfers) are used, such transfers may be made individually or in an aggregate fashion (e.g., daily, weekly, monthly, etc.) and statements provided upon completion thereof. In some cases, the ACH transactions may be initiated by a bank rather than by the funds transfer system itself—in other words, the server 12 may generate instructions for transmission to a bank; rather than initiating the ACH transaction directly. Further details regarding the fraud review and settlement processes may be found in co-pending application Ser. No. 09/312,028, entitled "Computer-Assisted Funds Transfer System" filed May 14, 1999, and assigned to the Assignee of the present invention, which is incorporated herein by reference in its entirety.

Figure 2:
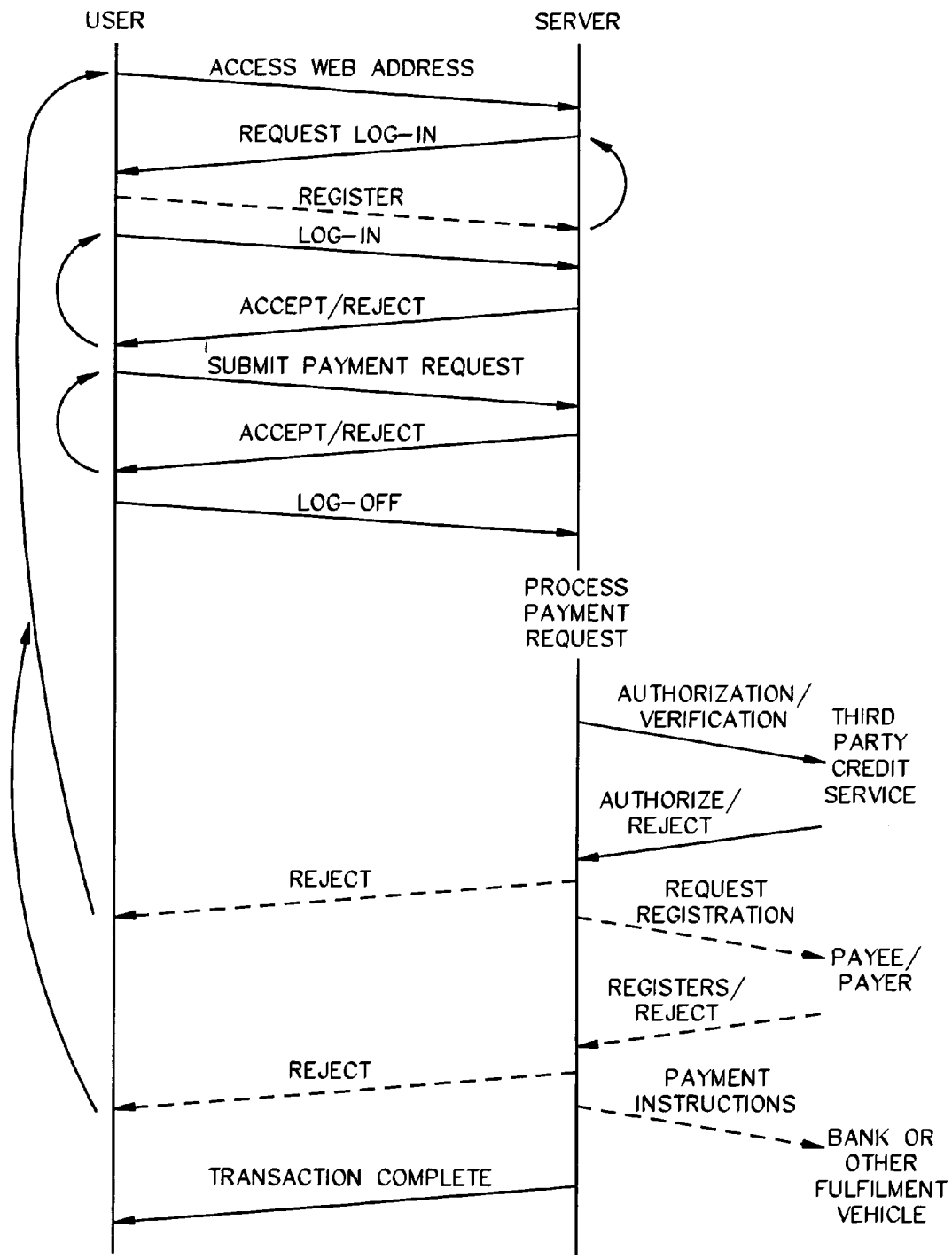
FIG. 2 illustrates an exemplary client/server dialog for a user initiating a funds transfer transaction utilizing the present funds transfer service.

FIG. 2 illustrates one example of dialog between a user and server 12, as may occur when a payer utilizes the present funds transfer service to transfer payment to a payee or vice versa. The user accesses server 12 by pointing a Web browser (e.g., as may be running on a personal computer or other Internet/network-capable device) to the Web address of the server. Initially, the server may ask the user to log-in or register, for example by providing the payer with a Web form to submit a user name and/or password. In those cases where the user is a first time user, he/she may first need to register with the service before being able to log-in. Part of the registration process will be to select a password for use in later transactions. The log-in dialog may need to be repeated if errors in the user name and/or password are encountered.

Where required, the registration process is designed to collect credit and authentication information regarding the user that may be used during later funds transactions processing operations. For example, such information (perhaps as periodically updated by the user and/or by the funds transfer system in response to usage by the user and/or information obtained from/through third parties) may be used as part of the risk assessment process outlined above. Thus, during registration a user may be asked to supply credit card, bank account, home and/or work address and/or other information. Further, authorization for later credit checks may be received, for example to enable the funds transfer service (or the service provider) to obtain credit and/or authentication reports and/or information from third parties such as credit reporting agencies, check authorization/guarantee organizations, financial institutions, etc. Ultimately, both payers and payees will become registered with the service so that both (all) parties to a transaction can be verified through the risk assessment process on a transaction by transaction (or other, e.g., periodic; monthly, daily, etc.) basis before any given transaction is settled.

Once logged-in, the user may submit a payment request through the use of one or more Web forms provided by the server. This may be a request by a payer to transmit funds to one or more payees or a request by a payee to collect funds from one or more payers. In general, the payment request will specify a payment amount, a payment method (e.g., credit/debit card/account and/or checking account information) and the identity (e.g., e-mail address(s)) of one or more payees/payers, etc. One or more payment requests may be made at a time, and some may need to be repeated to correct errors in transmission, etc. Once the payment request has been submitted, the user may log-off.

Once submitted, the payment request is reviewed according to the fraud check processes discussed in the above-mentioned co-pending application. Briefly, the fraud check/risk assessment process is an opportunity for the funds transfer service to verify/analyze the credit, authentication and/or other information provided by the user and/or obtained from other sources. The criteria by which this assessment is made may vary from transaction to transaction but may include such factors as the amount being transferred, the user's payment preferences (e.g., use of credit card, debit card or electronic check authorizing retrieval of funds directly from a checking account), prior user history (e.g., as may be stored at server 12 as each transaction is attempted and/or settled) or other criteria. Also various forms of authorization (both electronic and/or physical) provided by third parties (credit card issuers, check acceptance/guarantee services, credit scoring agencies, etc.), credit history reports (e.g., as provided by credit reporting agencies, etc.) and/or previous histories of the payer(s)/payee(s) (e.g., based on previous transactions) may be used to assess the risk involved in the transaction.

In some cases, this fraud check may indicate that the transaction is one that poses a high degree of risk and/or that review by non-automated means (e.g., human risk management assessors) is needed. Where needed, such a manual review process may be performed. If, in the end, the transaction fails the fraud check procedure, then the payer(s) and/or the payee(s) may be so notified, for example by e-mail messages. As part of such messages or in follow up communications, a request for additional credit and/or authentication information (e.g., an alternative credit card and/or bank account) may be made. This provides the user with another opportunity to complete the funds transfer. If the additional information is provided, the fraud check process may be reinitiated on the basis of this new information. Otherwise, the transaction is declined.

Subsequent to or concurrently with the fraud check, the funds transfer service may transmit e-mail messages to the other parties (e.g., payee(s) or payer(s)) to the transaction indicating that the user has requested use of the service to facilitate a payment. This is especially true where the party identified by the user is not registered with the funds transfer service. As part of such an e-mail message, the unregistered parties may be presented with a uniform resource locator (URL) that specifies a Web address of the server. By pointing a browser at that Web address, such parties may register with the service (if they are not already so registered), access the transaction of interest (i.e., the one initiated by the user) and provide payment instructions. In those cases where a party declines the invitation to use the service, the user that initiated the transaction may be notified (e.g., by e-mail message).

Where a party does agree to participate in the transaction, his/her identity and/or credit/authentication information may also be subjected to a fraud check/risk assessment similar to that discussed above. In this way, both parties to the funds transfer transaction may be verified before any authorization for a funds transfer is actually given.

Assuming that the fraud check process is passed successfully (on both sides), the transaction may be settled. Depending upon the payment method and/or the payee's preferences, this settlement may be accomplished in any of a number of forms. For example, the credit card information submitted by the payer may be passed to a third party not otherwise associated with the transaction for processing to obtain funds. Once received, such funds may be transferred to the payee by ACH transfer or other means.

Alternatively, where electronic checks are used, the funds transfer service may instruct an associated merchant bank to initiate an ACH pull transaction from the payer's account and transfer the funds to the account specified by the payee(s) in accordance with conventional ACH transactions between banks. In other cases, the ACH transaction may be initiated by the funds transfer system directly, without the use of a merchant bank. Where third party check guarantors are used, funds may be delivered to payees before actually being received from payers' accounts.

Where the payee chooses to receive a hard copy check (or other instrument such as a money order) instead of an ACH transfer, payment instructions may be generated and the instrument (check, money order, etc.) produced and transmitted to the payee. The parties may then be notified of a successfully completed transaction.

Thus, a funds transfer system for computer assisted transactions has been described. The service provided by such a system may be self-replicating (or viral) in as much as users who are seeking to transmit funds to non-registered individuals may themselves act as conduits for spreading usage of the system. For example, a non-registered individual who is to receive a payment or to whom a request for payment is sent may be provided with an invitation to register with the service (e.g., as part of an e-mail message regarding the payment transfer). Indeed, such registration may be required before the transfer can be completed. In this way more and more individuals may become registered users. Of course, although the present scheme has been discussed with reference to various illustrated embodiments, it should be appreciated that the present invention is not limited thereby and, instead, is to be measured only in terms of the claims which follow.

What is claimed is:

1. A server system that provides a network-based service for transferring funds between users, the server system comprising:
    a web-based user interface module that is adapted to be used by both payers and payees to effect funds transfer transactions, the web-based user interface module including:
        a registration interface through which users register with the funds transfer service to send payments to other users and/or receive payments from other users, wherein the registration interface collects financial account information and authentication information from the users; and
        a payment request interface through which a payer can generate a payment request for initiating payment to a target payee, and through which a payee can generate a payment request for requesting payment from a target payer, wherein the payment request interface enables generation of a payment request that specifies an email address of a target payer or payee who is not yet registered with the funds transfer service; and
    a transaction processing engine that receives and processes the payment requests submitted via the web-based user interface module, wherein the transaction processing engine is responsive to the payment request that specifies the email address of the target user who is not registered with the funds transfer service by sending to the email address of the target user an email message specifying a URL for accessing the server system, whereby the target user may access the URL to register with the funds transfer service and supply instructions for completing an associated funds transfer transaction.

2. The server system of claim 1, wherein the transaction processing engine performs transaction-specific risk assessments in which information supplied by the payer and payee in a funds transfer transaction is analyzed prior to transaction execution.

3. The server system of claim 2, wherein the transaction processing engine further takes into consideration transaction histories of payers and/or payees in performing the transaction-specific risk assessments.

4. The server system of claim 2, wherein the transaction processing engine further takes into consideration payment amounts when performing said transaction-specific risk assessments.

5. The server system of claim 1, wherein the payment request interface further supports the generation of a payment request in which a payee requests payment from a plurality of payers.

6. The server system of claim 1, wherein the payment request interface comprises one or more web forms for composing and submitting a payment request.

7. The server system of claim 1, wherein the web-based user interface module and the transaction processing engine support the ability for a payer to make a credit card payment to a payee without exposing associated credit card account information to the payee.

* * * * *